(12) United States Patent
Belter et al.

(10) Patent No.: US 7,559,556 B2
(45) Date of Patent: Jul. 14, 2009

(54) MLS GASKET COMPRESSION LIMITER

(75) Inventors: Jerome G. Belter, Mount Prospect, IL (US); Rohit Ramkumar, Romeoville, IL (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 0 days.

(21) Appl. No.: 11/326,644

(22) Filed: Jan. 6, 2006

(65) Prior Publication Data

US 2007/0158918 A1 Jul. 12, 2007

(51) Int. Cl.
*F02F 11/00* (2006.01)
(52) U.S. Cl. ...................................... 277/593
(58) Field of Classification Search .......... 277/591–594
See application file for complete search history.

(56) References Cited

U.S. PATENT DOCUMENTS

| | | | |
|---|---|---|---|
| 5,082,298 A | 1/1992 | Uchida et al. | |
| 5,211,408 A | 5/1993 | Udagawa | |
| 5,286,039 A | 2/1994 | Kawaguchi et al. | |
| 5,609,345 A | 3/1997 | Miura et al. | |
| 5,863,046 A | 1/1999 | Dietz et al. | |
| 5,875,548 A | 3/1999 | Diez et al. | |
| 6,053,503 A | 4/2000 | Buck et al. | |
| 6,186,513 B1 * | 2/2001 | Udagawa | 277/593 |
| 6,315,303 B1 | 11/2001 | Erb et al. | |
| 6,565,098 B2 | 5/2003 | Bleyh | |
| 6,644,669 B2 | 11/2003 | Unseld et al. | |
| 6,769,696 B2 * | 8/2004 | Diez et al. | 277/593 |
| 6,814,357 B2 * | 11/2004 | Diez et al. | 277/593 |
| 2005/0206091 A1 * | 9/2005 | Detmann et al. | 277/594 |
| 2006/0175763 A1 * | 8/2006 | Duckek et al. | 277/593 |
| 2007/0013145 A1 * | 1/2007 | Detmann et al. | 277/593 |

FOREIGN PATENT DOCUMENTS

WO    WO2004/076893 A1 *  9/2004

* cited by examiner

*Primary Examiner*—Patricia L Engle
*Assistant Examiner*—Gilbert Y Lee
(74) *Attorney, Agent, or Firm*—Marshall & Melhorn, LLC

(57) ABSTRACT

An embodiment provides a MLS gasket that includes a metal layer having an external periphery, an upper surface generally defining a first plane, and a lower surface generally defining a second plane. The first and second planes define a layer thickness therebetween. At least one cylinder aperture is formed in the metal layer. The metal layer includes a stopper portion formed adjacent at least a portion of the external periphery. The stopper portion is formed such that at least a portion of the stopper portion extends above the first plane. At least a portion of the stopper portion extends below the second plane. An average thickness of the stopper portion is less than the layer thickness. The gasket also includes a first sealing layer adjacent the metal layer. The first sealing layer includes a first bead portion. Compression of the first bead portion is selectively limited by the stopper portion.

11 Claims, 3 Drawing Sheets

MLS GASKET COMPRESSION LIMITER

TECHNICAL FIELD

The technical field is related generally to multi layer steel (MLS) gaskets, and more particularly to compression limiters for MLS gaskets and methods of forming a compression limiter on a desired portion of a MLS gasket.

BACKGROUND

In recent years, MLS cylinder head gaskets for internal combustion engines have become a preferred choice with at least two gasket layers formed from steel. In a typical MLS gasket, the layers are formed with a plurality of openings. More specifically, typical gaskets include cylinder bore openings, coolant openings, bolt holes and oil holes. Typically, the gasket includes full beads around the cylinder bore openings and half beads that surround the non-cylinder bore openings and the outer periphery of the gasket. The bolt holes, which are generally located around the periphery of the gasket, cooperate with bolts to secure the gasket between the cylinder head and engine block. The cylinder bore openings, coolant holes and oil holes are sealed by surface pressures formed by the clamping action of the bolts to deform the half or full beads, thereby creating a sealing pressure between the portions of the cylinder head and engine block that are in contact with the gasket.

Generally, when the bolts are tightened, the surface pressure between portions of the cylinder head and engine block that are in contact with the gasket varies somewhat throughout the sealing joint. Since the seal of cylinder bore openings is generally of primary concern in head gasket manufacture, other sealing portions, usually half beads, of the gasket must accommodate this priority of design. During engine operation, the high pressures and temperatures, and the operating conditions at the head gasket location cause movement between the cylinder head and the cylinder block. This movement causes a variation in sealing pressures and may cause the full beads or half beads to compress until bead portions contact a surface that inhibits further compression. This variation in sealing pressure is especially prevalent in the half beads surrounding the non-cylinder bore openings.

With respect to outer edges of the gasket, for example, to compensate for unequal surface pressures, one solution has been to provide a half bead around the periphery of the gasket. The half bead deforms and recovers with relative movement between the cylinder block and cylinder head, thereby ensuring a seal therebetween. However, during many operating conditions, some portions of the half beads becomes fully compressed, or fully deformed, between the cylinder head and engine block, and may experience a reduction of recovery capability and/or characteristics, and hence the sealing effectiveness of the half bead.

In practice, no cylinder head and cylinder block mating surfaces are perfectly planar or perfectly parallel. Gaps between the cylinder head and cylinder block exist if an engine were to be assembled without a gasket interposed therebetween. With a gasket installed between the cylinder head and cylinder block, areas of localized stress are created when fasteners (not shown) such as a bolt are positioned through bolt holes, and then tightened to secure the cylinder head and cylinder block. These gaps result in unequal sealing stresses around the bolt holes, the cylinder bore openings, and other portions of the gasket. Furthermore, the gasket will be subject to high loads in compression during engine operation. This high compression loading generates higher stresses that may result in an undesirable reduction in recovery capability and/or characteristics of the gasket, such as cracking of bead portions or plastic deformation of bead portions.

Evaluations have been performed on gaskets that have experienced an undesirable reduction in recovery capability and/or characteristics at portions, such as the peripheral edges. In many gaskets evaluated, the undesirable reduction in recovery capability and/or characteristics of half bead portions were limited to predictable peripheral areas for different applications (such as bead profile or engine type, i.e. four cylinder, eight cylinder). Accordingly, there is a need to provide a sealing mechanism that may prevent half beads from being undesirably altered during engine operation, thereby reducing sealing effectiveness or introducing potential leaks.

SUMMARY

An embodiment provides a MLS gasket that includes a metal layer having an external periphery, an upper surface generally defining a first plane, and a lower surface generally defining a second plane. The first and second planes define a layer thickness therebetween. At least one cylinder aperture is formed in the metal layer. The metal layer also includes a stopper portion formed adjacent at least a portion of the external periphery. The stopper portion is formed such that at least a portion of the stopper portion extends above the first plane. At least a portion of the stopper portion extends below the second plane. An average thickness of the stopper portion is less than the layer thickness. The gasket also includes a first sealing layer adjacent the metal layer. The first sealing layer includes a first bead portion. Compression of the first bead portion is selectively limited by the stopper portion.

Another embodiment provides a metal layer for a MLS gasket that includes a periphery, an upper surface generally defining a first plane, and a lower surface generally defining a second plane. The first plane and the second plane generally define a layer thickness of the metal layer therebetween. The gasket also includes a cylinder aperture selectively superposed about a cylinder of an internal combustion engine. The gasket further includes a stopper portion formed adjacent at least a portion of the periphery and defining a boundary between the stopper portion and immediately adjacent portions of the metal layer. At least a portion of the upper surface extends above the first plane. At least a portion of the lower surface extends below the second plane. An average density of the stopper portion is greater than an average density of the metal layer.

Another embodiment provides a method of manufacturing a MLS gasket. The method includes forming a first sealing layer. The step of forming the first sealing layer includes forming a first bead portion. The method also includes forming a second sealing layer. The step of forming the second sealing layer includes forming a second bead portion. The method further includes forming a spacer layer. The step of forming the spacer layer includes the step of forming a stopper portion between a boundary and a periphery of the spacer layer. The stopper portion is defined by a plurality of depressed portions and a plurality of raised portions. At least one of the raised portions extends between the boundary and the periphery. The depressed portions are separated by at least one of the raised portions along the periphery.

DETAILED DESCRIPTION

Figure 1:
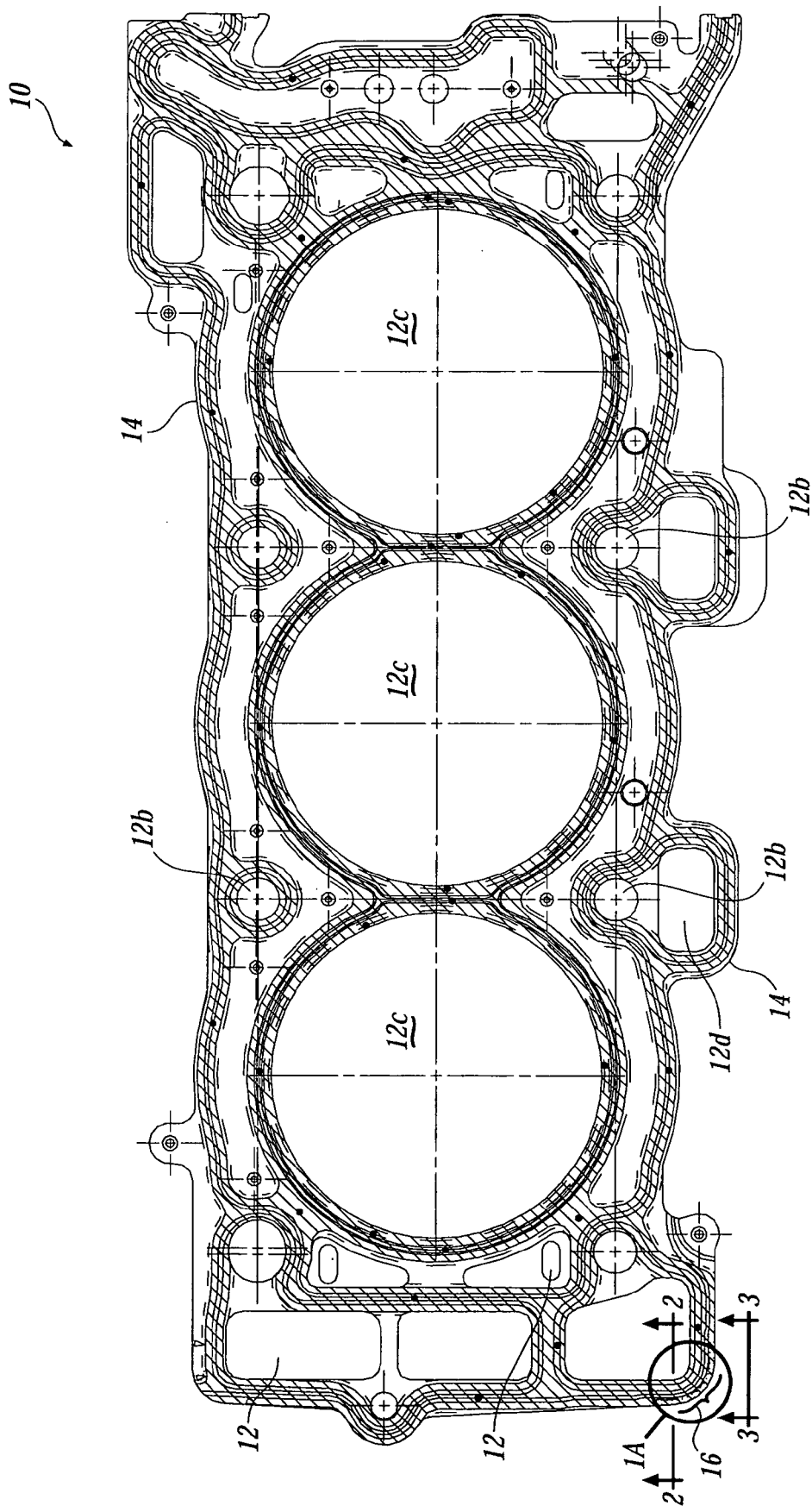
FIG. 1 is a plan view of an MLS cylinder head gasket in accordance with one embodiment, with surface graphics applied to raised portions.

FIG. 1 illustrates an embodiment of a MLS gasket 10. The gasket 10 is defined in part by a plurality of apertures 12 such as bolt holes 12b, cylinder bore openings 12c, that are aligned with corresponding apertures of a cylinder head (not shown) and cylinder block (not shown) of an engine, and oil holes 12d. The gasket 10 is further defined by an outer periphery 14. The outer periphery 14 includes a known region of undesirable half bead alteration during operation 16, as discussed in greater detail below. When the engine is fully assembled, the gasket 10 is positioned between the cylinder head and cylinder block to fill gaps and seal around the openings 12, and bolts (not shown) are tightened within the bolt holes 12b to compress the gasket 10, as discussed below. The seal generated by gasket 10 serves to prevent leaks between openings 12, and at the outer periphery 14 of the gasket 10.

Figure 2:
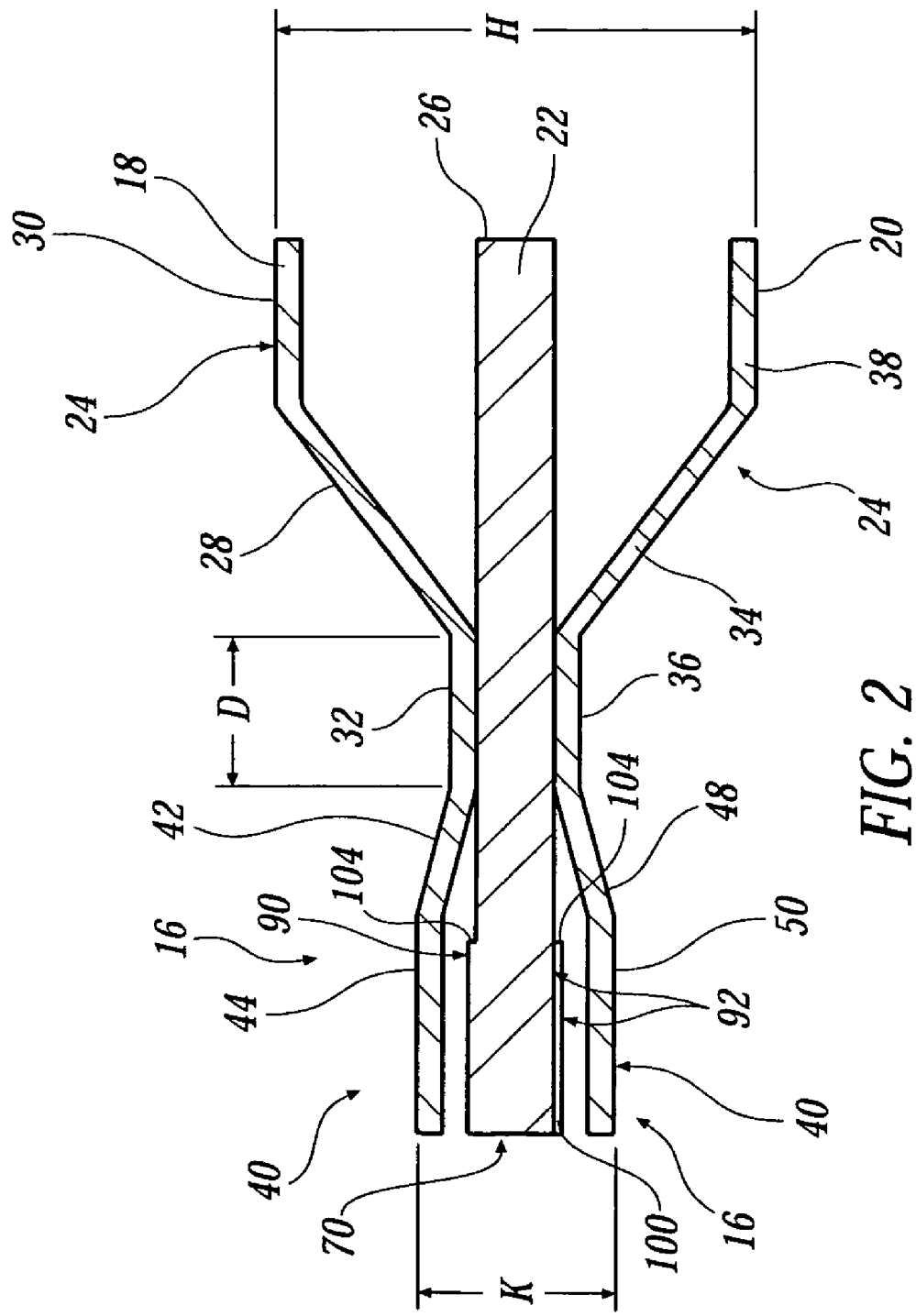
FIG. 2 is an enlarged sectional view of a fragmentary portion taken along line 2-2 of FIG. 1.

As best seen in FIG. 2, the gasket 10 is a multi-layered gasket having at least a first sealing layer, or first metal layer, 18, a second sealing layer, or second metal layer, 20, and a spacer layer, or a third metal layer 22. The third metal layer 22 is a relatively thick metal layer, and is generally called a spacer layer. The third metal layer 22 is interposed between the first metal layer 18 and the second metal layer 20. First and second metal layers 18, 20 are relatively thin in comparison with the third layer 22 and are preferably constructed of 301 stainless steel, a relatively robust metal with a high spring rate for meeting desired performance requirements over a useful gasket life. The third metal layer 22 is preferably formed of a less robust metal, such as 409 stainless steel, or in some cases even zinc-plated or plain low carbon steels. Each of the metal layers 18, 20, 22 include corresponding apertures 12 formed therein such that all of the holes and openings of each metal layer 18, 20, 22 align when assembled into gasket 10, as best seen in FIG. 1.

The gasket 10 is provided with a pair of half beads 24 that surround an inner periphery 26 of one of the apertures 12. The half beads 24 include a half bead 28 formed in the first metal layer 18 and having a cylinder head contacting portion 30 extending from a spacer layer contacting portion 32, and a half bead 34 formed in the second metal layer 20 extending from a spacer layer contacting portion 36 with a cylinder block contacting portion 38 extending therefrom. The half beads 24 are generally spaced a distance of bead height H after assembly of the gasket 10 and prior to tightening the bolts, in order to provide a desired sealing pressure around the apertures 12 after the bolts are tightened.

In the embodiment illustrated, the gasket 10 is further provided with a pair of half beads 40 that are positioned adjacent the outer periphery 14. The half beads 40 are spaced from half beads 24 by the spacer layer contacting portions 30, 36 a predetermined distance D. Similar to the half beads 24, the half beads 40 are formed on both the first metal layer 18 and the second metal layer 20.

More specifically, the first metal layer 18 includes a first leg portion 42 that extends upwardly from the spacer layer contacting portion 32 of first metal layer 18. First leg portion 42 terminates in a generally planar apex portion 44. The generally planar apex portion 44 extends from the first leg portion 42 to an outer edge 46 of the first metal layer 18. The second metal layer 20 also includes a first leg portion 48 that extends downwardly from the spacer layer contacting portion 36 of second metal layer 20 and terminates in a generally planar base portion 50.

Figure 3:
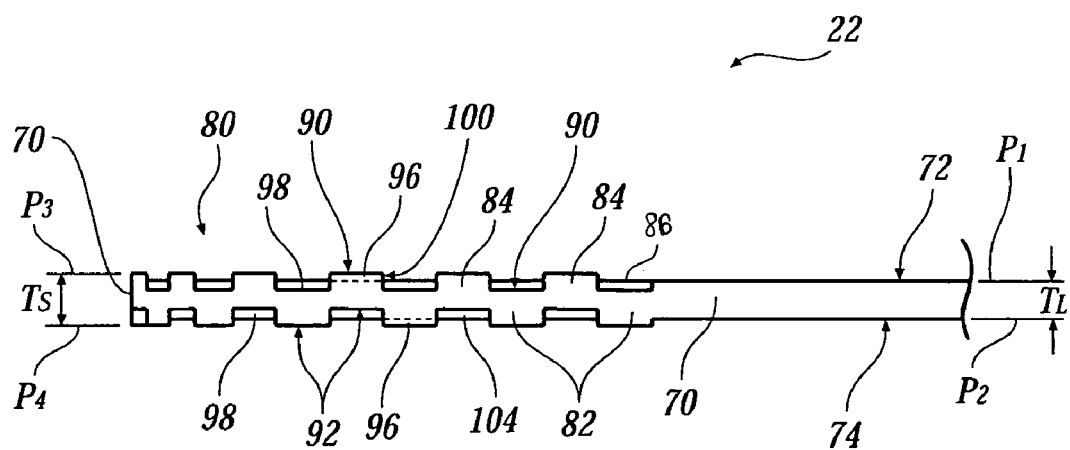
FIG. 3 is an enlarged view of a fragmentary portion taken along line 3-3 of FIG. 1, with layers removed for clarity.

As best seen in FIGS. 2 and 3, the third metal layer 22 is defined by an external periphery 70, an upper surface 72 generally defining a first plane P1, and a lower surface 74, generally defining a second plane P2. Generally, the first plane P1 and the second plane P2 define a layer thickness TL of the third metal layer 22 therebetween. The first plane P1 is generally parallel to the second plane P2.

As also seen in FIGS. 2 and 3, the third metal layer 22 includes a stopper portion 80. The stopper portion 80 is formed from a portion of the third metal layer 22 adjacent at least a portion of the external periphery 70. The stopper portion 80 includes a plurality of depressed portions 82 and a plurality of raised portions 84. A boundary 86 separates the stopper portion 80 and the remainder of the third metal layer 22. In the embodiment illustrated, each of the depressed portions 82 and the raised portions 84 extend between the boundary 86 and the external periphery 70. The depressed portions 82 are separated by the raised portions 84 along the external periphery 70.

As best seen in FIG. 3, the stopper portion 80 is further defined by a top surface 90 and a bottom surface 92. As illustrated, each of the depressed portions 82 and the raised portions 84 are defined by a portion of the top surface 90 and a portion of the bottom surface 92.

The known region 16 is an area of the gasket 10 including all layers 18, 20, 22. As discussed below, the known region 16 is identified by examining a gasket, such as the gasket 10, to locate areas of bead portions, such as the half beads 40, where recovery capability and/or characteristics are not as desired. When a region, such as the known region 16, is identified for a gasket bead portion in a sealing layer, the portion of the spacer layer that contacts the bead portion is a known region and a candidate for a stopper portion, such as the stopper portion 80, to reduce undesirable loss of bead recovery capability and/or characteristics.

Figure 1A:
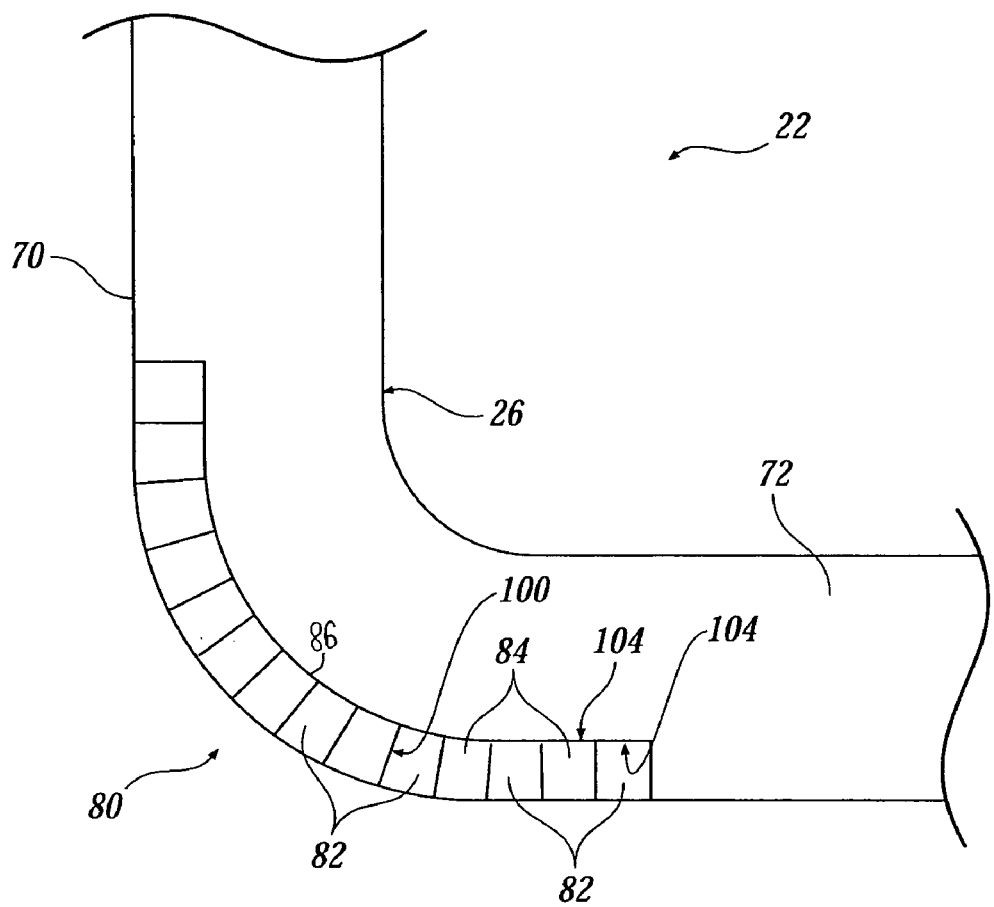
FIG. 1A is a partial plan view of the gasket of FIG. 1 taken from area 1A, with a portion of the gasket removed for clarity.

Preferably, the stopper portion 80 is formed by coining in a single strike. Coining the stopper portion 80 will typically result in the formation of at least portions that have an average higher density than the average density of the material that was coined. That is, as best seen in FIG. 1A, the third metal layer 22 has a coined stopper portion 80 formed on the known region 16 of the third metal layer 22. In the embodiment illustrated, the stopper portion 80 is formed on only the known region 16, intersecting the external periphery 70 of the third metal layer 22. Also preferred, the single coining strike is performed by directing a forming force toward the third layer 22 generally perpendicular to the surfaces 72, 74.

Preferably, the stopper portion 80 will be formed on at least a portion of the known region 16, although the stopper portion 80 may be extend beyond the known region 16. A gasket, such as the gasket 10, may include more than one known region known region 16. Also preferably, the stopper portion 80 will be limited to a portion of the gasket 10 defined by about two inches of length along the external periphery 70, although the stopper portion 80 may be limited to a portion of the gasket 10 defined by about one inch of length along the external periphery 70, or other desired lengths.

As best seen in FIG. 3, the raised portions 84 extend above the first plane P1 defining a raised volume 96, and the depressed portions 82 extend below the second plane P2, also generally defining the raised volume 96. The depressed portions 82 extend below the first plane P1 generally defining a depressed volume 98, and the raised portions 84 extend above the second plane P2, also generally defining the depressed volume 98. Preferably, the formation of the stopper portion 80 results in each depressed volume 98 being greater than each raised volume 96, as at least a portion of the material of the third metal layer is densified in the stopper portion 80 as well as moved during coining. Accordingly, the stopper portion 80 has a greater average density than the density of the remainder of the third metal layer 22.

The top surface 90 of the raised portions 84 generally define a third plane P3. The bottom surface 92 of the depressed portions 82 generally define a fourth plane P4. The stopper portion 80 has a stopper thickness TS defined between the third plane P3 and the fourth plane P4. The stopper thickness TS is greater than the layer thickness TL. Preferably, the stopper thickness TS is about 0.15 mm greater than the layer thickness TL. Also preferably, the stopper thickness TS is about 0.80 mm and the layer thickness TL is about 0.65 mm. In one embodiment, the stopper thickness TS is about 0.12 mm to about 0.16 mm greater than the layer thickness TL. With the layer thickness TL of about 0.65 mm, each of the first metal layer 18 and the second metal layer 20 are preferably about 0.20 mm thick.

In the embodiment illustrated, the stopper portion 80 is further defined by a transition surface 100 defining a boundary between the top surface 90 of a raised portion 84 and the top surface 90 of an adjacent depressed portion 82. A boundary transition surface 104 extends between the boundary 86 and the top surface 90 of each depressed portion 82 and each raised portion 84. Preferably, the transition surfaces 100 and the boundary transition surfaces 104 are formed at about right angles to the top surfaces 90 and the bottom surfaces 92. Importantly, although the surfaces 70, 90, 92, 100, and 104 of the stopper portion 80 are depicted as being generally planar, the surfaces 70, 90, 92, 100, and 104 need not be planar.

In accordance with one aspect of one embodiment, the gasket 10 is formed such that the half beads 40 define a predetermined bead height K to provide a desired level of surface pressure between the half beads 40 and the cylinder head and cylinder block, without compromising the sealing characteristics of the half bead 24. More specifically, the half beads 40 are formed so as to have a height K that is somewhat less than the bead height H of half bead 24. Thus, the half beads 40, which extend outwardly from the spacer layer contacting portions 32, 36 of the first metal layer 18 and the second metal layer 20 in opposite directions may contact stoppers or embossments formed on the third metal layer 22, or may be sufficiently resilient to limit undesirable deformation of the half beads 24 between the engine block and the cylinder head, thereby preserving the recovery characteristics of half beads 24 during thermal expansions and contractions.

One embodiment of a method of manufacturing the gasket 10 is as follows. A representative gasket, similar to the gasket 10, but without the stopper portion 80, around the periphery of a spacer layer or selected holes, is operated in an engine until sealing characteristics of sealing layers, such as the layers 18, 20, have changed. The gasket is removed and examined to identify potential reasons for the change in sealing characteristics, such as loss of bead recovery, or other changes that may benefit from having. Preferably, a representative portion of the gasket that is susceptible to undesirable bead alteration is identified, such as the known region 16, on a layer, such as the spacer, or third metal layer 22.

Next, a gasket, such as the gasket 10 is selected and a stopper portion, such as the stopper portion 80, is formed on the identified representative portion. Preferably, forming the stopper portion includes coining. Also preferably, the spacer layer, such as the third metal layer 22, is formed such that the stopper portion, such as the stopper portion 80, is formed between a boundary, such as the boundary 86, and a periphery, such as the external periphery 70, of the spacer layer.

Coining of the stopper portion 80 is preferably performed with a coining die (not shown) that mates with the depressed portions 82, raised portions 84, and surfaces 90, 92, 100, 104. A preferable coining process for forming the stopper portion 80 includes a single strike with the coining die using sufficient energy to form the stopper portion 80. Other finishing steps of the gasket 10 may include the application of an elastomeric coating on desired surface of the gasket 10, or an undulation or other deformation limiter formed in the third metal layer 22 and circumscribing the cylinder bore openings 12c.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A multi-layered steel gasket comprising:
a metal layer having an external periphery, an upper surface generally defining a first plane, and a lower surface generally defining a second plane, wherein said first and second planes define a layer thickness of said metal layer therebetween;
at least one cylinder aperture formed in said metal layer;
a stopper portion formed from a portion of said metal layer adjacent at least a portion of said external periphery, wherein said stopper portion is formed such that at least a portion of said stopper portion extends above said first plane, at least a portion of said stopper portion extends below said second plane, and wherein an average thickness of said stopper portion is less than said layer thickness; and
a first sealing layer adjacent said metal layer, wherein said first sealing layer includes a first bead portion adjacent said external periphery, and compression of said first bead portion is selectively limited by said stopper portion, said first sealing layer also comprising a second bead portion separated from said first bead portion by a metal layer contacting portion, said second bead portion having a greater height above said metal layer than said first bead portion.

2. The gasket of claim 1, further comprising a second sealing layer adjacent said metal layer, wherein said second sealing layer includes a second bead portion and compression of said second bead portion is selectively limited by said stopper portion.

3. The gasket of claim 1, wherein said stopper portion extends for less than about two inches along said periphery.

4. The gasket of claim 1, wherein said stopper portion extends for less than about one inch along said periphery.

5. The gasket of claim 1, wherein an average density of said stopper portion is greater than an average density of said metal layer.

6. The gasket of claim 1, wherein said stopper layer is coined.

7. A multi-layered steel gasket comprising:
a periphery of a metal layer;
an upper surface of said metal layer generally defining a first plane;
a lower surface of said metal layer generally defining a second plane, wherein said first plane and said second plane generally define a layer thickness of said metal layer therebetween;
a cylinder aperture selectively superposed about a cylinder of an internal combustion engine;
a stopper portion formed adjacent at least a portion of said periphery, wherein at least a portion of said stopper portion is defined, at least in part, by a top surface and a bottom surface defining a stopper thickness therebetween, at least a portion of said top surface extends above said first plane, at least a portion of said bottom surface extends below said second plane;
a first sealing layer above said upper surface and having a first bead portion comprising a leg extending toward said periphery to a planar apex, a second bead portion and a metal layer contacting portion between said bead portions; and
a second sealing layer below said lower surface and having a first bead portion comprising a leg extending toward said periphery to a planar apex, a second bead portion and a metal layer contacting portion between said bead portions;
wherein said first bead portions of said first and second sealing layers are positioned about said periphery of said metal layer and said second bead portions are greater in height than said first bead portions.

8. The gasket of claim 7, wherein said stopper portion is defined by a plurality of depressed portions and a plurality of raised portions, wherein at least one of said raised portions extends between said boundary and said periphery, and wherein said depressed portions are separated by at least one of said raised portions along said periphery.

9. The gasket of claim 7, wherein said periphery is an external periphery, and wherein an average stopper thickness of said stopper portion is greater than said layer thickness.

10. The gasket of claim 7, wherein an average stopper thickness of said stopper portion is less than said layer thickness.

11. The gasket of claim 7, wherein said stopper portion extends for less than about two inches along said periphery.

* * * * *